US008686921B2

(12) United States Patent
Lyons et al.

(10) Patent No.: US 8,686,921 B2
(45) Date of Patent: Apr. 1, 2014

(54) DYNAMIC GEOMETRY MANAGEMENT OF VIRTUAL FRAME BUFFER FOR APPENDABLE LOGICAL DISPLAYS

(75) Inventors: Kenton M. Lyons, San Jose, CA (US); Roy Want, Los Altos, CA (US); Trevor A. Pering, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1370 days.

(21) Appl. No.: 12/347,878

(22) Filed: Dec. 31, 2008

(65) Prior Publication Data

US 2010/0164970 A1 Jul. 1, 2010

(51) Int. Cl.
*G09G 5/00* (2006.01)
(52) U.S. Cl.
USPC .......................................... 345/1.1
(58) Field of Classification Search
USPC .................................. 345/1.1–3.4
See application file for complete search history.

(56) References Cited

U.S. PATENT DOCUMENTS

| 6,970,173 | B2 * | 11/2005 | Ciolac ........................... 345/544 |
| 2007/0296643 | A1 * | 12/2007 | Ben-Shachar et al. ......... 345/1.1 |
| 2008/0030425 | A1 * | 2/2008 | Fullerton et al. ............... 345/1.1 |

FOREIGN PATENT DOCUMENTS

| JP | 2000-287071 A | 10/2000 |
| JP | 2002-108736 A | 4/2002 |
| JP | 2006163991 A | 6/2006 |
| JP | 2006301105 A | 11/2006 |
| TW | 497043 B | 8/2002 |
| TW | 200809689 A | 2/2008 |
| TW | 200828032 A | 7/2008 |

OTHER PUBLICATIONS

Office Action received for Japanese Patent Application No. 2009-295029, mailed on Aug. 30, 2011, 2 pages of Office Action and 2 pages of English Translation.
Office Action received for Japanese Patent Application No. 2009-295029, mailed on Aug. 21, 2012, 2 pages of Office Action and 2 pages of English Translation.
Office Action Received for Taiwan Patent Application No. 98145007, mailed on May 24, 2013, 18 pages of Office Action including 6 pages of English translation.

* cited by examiner

*Primary Examiner* — Yong H Sim
(74) *Attorney, Agent, or Firm* — Ryder, Lu, Mazzeo and Konieczny, LLC; Douglas J. Ryder

(57) ABSTRACT

In general, in one aspect, the disclosure describes an apparatus having a frame buffer having a first area allocated to buffer display information for content to be displayed on a local display. A frame buffer allocator is to dynamically expand the frame buffer to include one or more additional areas allocated to buffer display information for content to be displayed on one or more remote displays associated with one or more wireless devices. A dynamic geometry manager is to configure the one or more additional areas of said frame buffer. One or more remote-frame-buffer protocols are to transfer the display information from the one or more additional areas to the one or more wireless devices. Other embodiments are described and claimed.

17 Claims, 4 Drawing Sheets

DYNAMIC GEOMETRY MANAGEMENT OF VIRTUAL FRAME BUFFER FOR APPENDABLE LOGICAL DISPLAYS

BACKGROUND

The use of wireless devices (e.g., portable computers, personal digital assistants (PDAs), cellular phones) is growing exponentially. Many wireless devices include a display having a relatively small display area. The display area may not be big enough to allow for convenient viewing of relatively large images (e.g., a large architectural blueprint, a spreadsheet having a large number of rows and/or columns).

BRIEF DESCRIPTION OF THE DRAWINGS

The features and advantages of the various embodiments will become apparent from the following detailed description in which.

DETAILED DESCRIPTION

In order to expand the display area available to wireless devices, wireless devices in close proximity to, and communicating with, one another can append their displays in order to create a larger display therebetween. The larger display, made up of individual displays, can be utilized to view relatively large images (e.g., a large architectural blueprint, a spreadsheet having a large number of rows and/or columns) that can not be conveniently viewed on a display of a single wireless device (host device) having the image contained therein. The host device may dynamically expand the amount of memory allocated to the display frame buffer so that the frame buffer is greater than the area being serviced by the display controller delivering an image to the host display (physical frame buffer). When another wireless device is located nearby (client display), the host device may place a portion of the image in a portion of the frame buffer not designated for the host display and associate it with the client display (logical frame buffer). The host device may then remotely drive the client display to display the portion of the image from the logical frame buffer using remote frame buffer (RFB) protocols.

Figure 1:
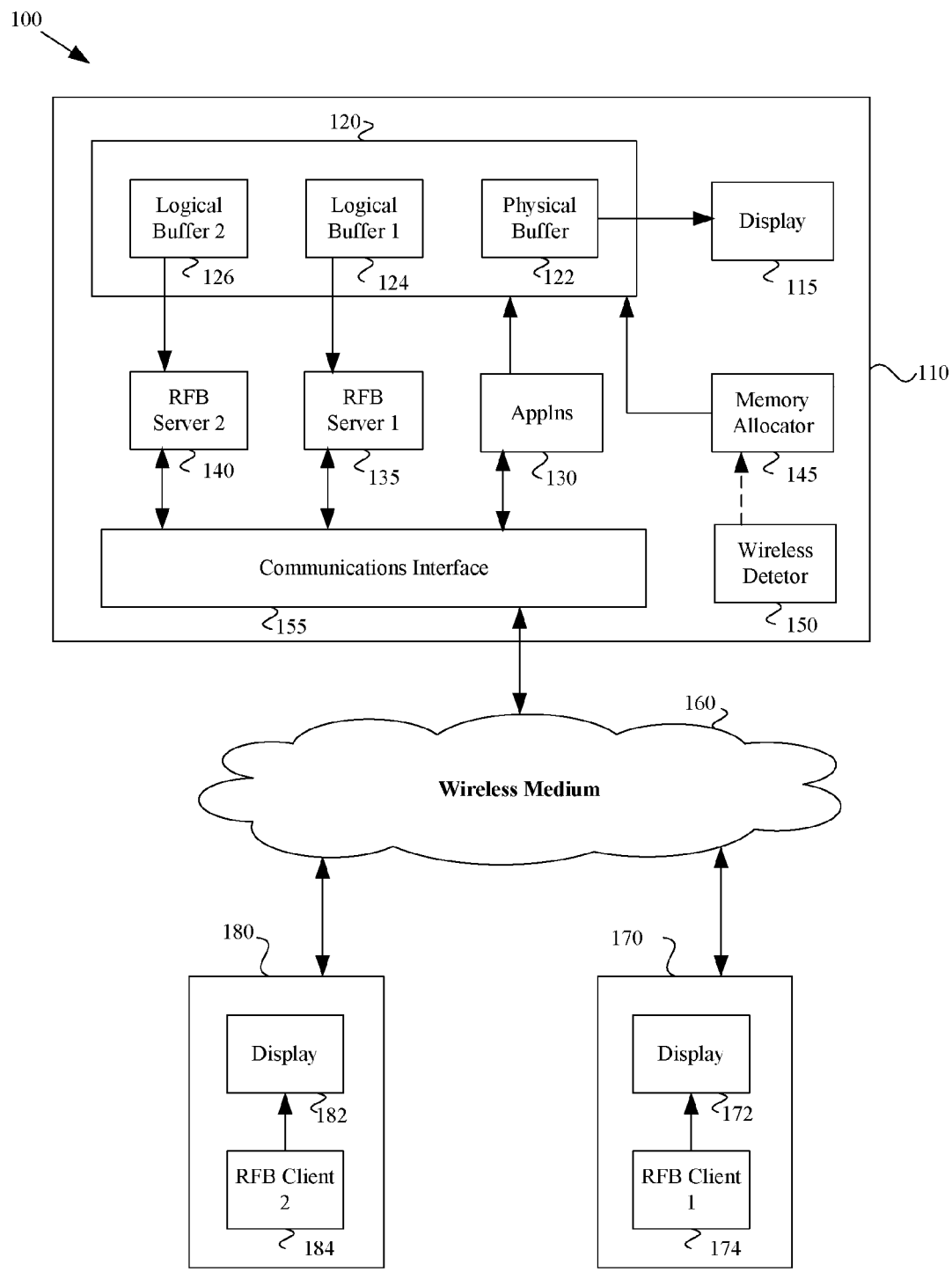
FIG. 1 illustrates a block diagram of an example system having a wireless device providing an image over displays of multiple wireless devices, according to one embodiment.

FIG. 1 illustrates a block diagram of an example system 100 wherein a wireless device is providing an image over displays of multiple wireless devices. The system 100 may include a host wireless device 110, a wireless medium 160, and a plurality of client wireless devices (first and second client wireless devices 170, 180 are illustrated). The wireless devices 110, 170, 180 may be, for example, laptop computers, tablet computers, personal digital assistants (PDA), cellular phones, or some combination thereof. The wireless medium 160 may be a wireless network, for example, a wireless local area network (WLAN) such as that compliant with IEEE standard 802.11.x (WiFi), a wireless metropolitan area network (WMAN) such as that compliant with the IEEE standard 802.16.x (WiMAX), or a wireless personal area network (WPAN) such as that compliant with the Bluetooth core specification version 2.0 with enhanced data rate (Bluetooth).

The host wireless device 110 may include a display 115, a frame buffer 120, one or more applications 130, one or more RFB server applications (first and second RFB servers 135, 140 illustrated), a memory allocator 145, a wireless detector 150, and a communication module 155. The display 115 is to display information associated with the application(s) 130 running thereon, the images which have been stored in the frame buffer 120. The application(s) 130 may include, for example, any application capable of presenting content to the user of the host wireless device 110. The application 130 may be capable of rendering content that is designed for presentation on an area larger than the display 115.

The frame buffer 120 is to buffer display information for the content generated by applications 130. The frame buffer 120 may include a physical frame buffer 122 to buffer display information (e.g., pixels) for content to be displayed on the display 115 and one or more logical frame buffers (first and second logical frame buffers 124, 126 illustrated) to buffer display information (e.g., pixels, commands necessary to generate the pixels, display geometry and relative positioning) for the client wireless devices (e.g., 170, 180). The memory allocator 145 is to dynamically expand the frame buffer 120 to include the logical frame buffers (e.g., 124, 126). The frame buffer 120 may be expanded for client wireless devices available to be utilized (e.g., in close proximity and capable of displaying remote content).

The memory allocator 145 may expand frame buffer 120 based on number and size of the client displays available. The memory allocator 145 may expand the frame buffer 120 to include logical frame buffers 124, 126 to buffer display information (e.g., pixels, commands, geometry) for content to be displayed on displays for client wireless devices 170, 180. The content to be displayed on the client displays may be contiguous (e.g., above, below) with the content to be displayed on the host display or the content to be displayed on other client displays. It should be noted that while the logical frame buffers 124, 126 may contain a viewpoint of the image that would appear to be continuous with the viewpoint of the image in physical frame buffer 122 or the other logical frame buffers 124, 126 the actual memory locations may be remote from each other.

The wireless detector 150 may detect one or more wireless devices (e.g., 170, 180) that are in close proximity of the wireless device 110. The wireless detector 150 may inform the user of the wireless device 110 that additional wireless devices are available. The wireless detector 150 may establish a wireless communication link with the wireless devices and may be able to determine if the other wireless devices in close proximity are capable of receiving content from the wireless device 110 and displaying the content on their display (if the wireless devices are client wireless devices (e.g., 170, 180)). The wireless detector 150 may provide the user with information only for those wireless devices that can be utilized to expand the display area (the client wireless devices 170, 180). The wireless detector 150 may provide an icon for each of the wireless devices 170, 180 available and the user may select the icon if they wish to engage the wireless device 170, 180. The presentation of the information regarding the available wireless devices 170, 180 and the selection of the wireless devices 170, 180 is in no way limited to the presentation and selection of icons. Rather, any means of presenting information regarding the available wireless devices 170, 180 and any means for selecting from the available wireless devices 170, 180 is within the current scope.

The wireless detector 150 may provide information regarding the client wireless devices 170, 180 selected by the user to the memory allocator 145. The memory allocator 145 may allocate memory to the client wireless device 170, 180 (create logical frame buffer 124, 126) based on static parameters (e.g., size) related to the client displays. The memory allocator 145 may prompt the user for configuration data regarding the location of the logical frame buffers 124, 126 with respect to the physical frame buffer 122. If the client devices 170, 180 and the host device 110 have previously interacted and been used to create a larger display the memory allocator 145 may reconfigure the frame buffer 120 to how it was previously configured. The user may be able to override the previous configuration.

The RFB servers 135, 140 are to transfer the display information from the logical frame buffers 124, 126 to the wireless devices 170, 180. The RFB servers 135, 140 may be associated with specific client devices 170, 180 and establish a communication link therewith. The RFB servers 135, 140 may include any suitable application, program and/or protocol capable of monitoring the logical frame buffers 124, 126 to detect a change in the display information (e.g., pixels, commands, geometry) buffered therein, and upon detecting a change in the display information, to transfer the display information (e.g., in a compressed format) to the wireless devices 170, 180. For example, the RFB servers 135, 140 may be a Virtual Network Computing (VNC) application or X-Windows applications.

The communications interface 155 may provide the communications between the host wireless device 110 and the client wireless devices 170, 180 over the wireless medium 160. The communications interface 155 may include network adapter(s) necessary to interface with the wireless medium 160. The communications interface 155 may also provide communications over the Internet and may include network adapter(s) for communicating therewith.

The client wireless devices 170, 180 may include displays 172, 182 and RFB client applications 174, 184. The displays 172, 182 are for displaying content (either local content or content presented remotely from a host wireless device). The RFB clients 174, 184 may provide images to the displays 172, 182 based on the display information received from the RFB servers 135, 140. If the display information received from the RFB servers 135, 140 was pixels the RFB clients 174, 184 may display the pixels on the displays 172, 182. If the display information received from the RFB servers 135, 140 was commands the commands may be utilized to generate pixels and the generated pixels may be presented on the displays 172, 182. The RFB clients 174, 184 may be running any number of RFB applications including a VNC application.

The image displayed by displays 115, 172, 182 may be a contiguous image so that the plurality of displays 115, 172, 182 appear to be one display.

The user of the host wireless device 110 may configure the arrangement of the client displays (e.g., 172, 182) based on static properties of the display (e.g., size) and the image to be displayed. The allocator 145 may expand the frame buffer to create a logical frame buffer for each of the client wireless devices (170, 180) based on the static properties of the displays 172, 182 (e.g., the size of the display). The user needs to manage the size and shape of the virtual frame buffer (combination of logical frame buffers (e.g., 124, 126)) as displays are added, removed, or rearranged. For example, the user may provide configuration information regarding the arrangement of the displays to the allocator 145 to ensure that the frame buffer is configured correctly (e.g., the viewpoint of the image is expanded into the virtual frame buffer in the correct direction when a new display is added).

Figure 2A:
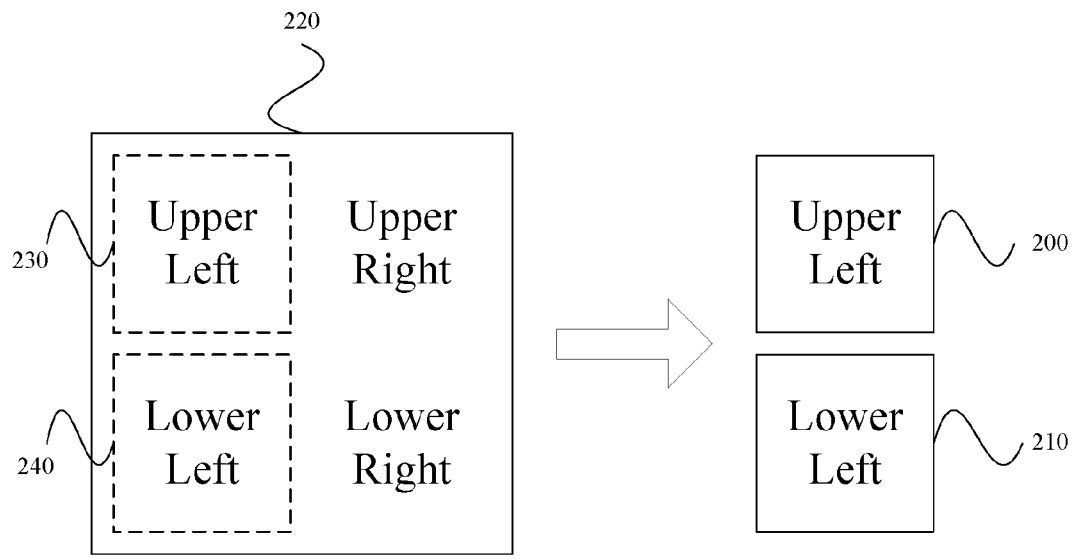
FIGS. 2A-B illustrate an example addition of a client display to be utilized by a host wireless device and correctly and incorrectly expanding the frame buffer of the host, according to one embodiment.
Figure 2B:
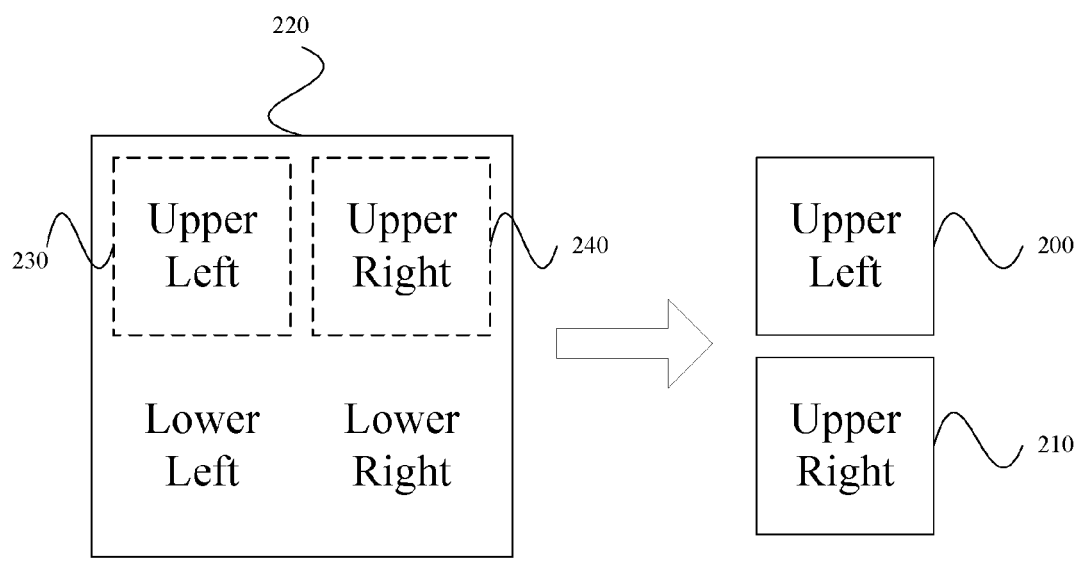

FIGS. 2A-B illustrate an example addition of a client display to be utilized by a host wireless device and correctly and incorrectly expanding the virtual frame buffer of the host. A client display 210 is added below the host display 200. The image 220 to be presented is four times the size of the host display 200 and is divided into four quadrants (upper left, upper right, lower left, lower right). The physical frame buffer 230 captures the upper left hand quadrant. FIG. 2A illustrates the frame buffer being expanded so that a logical frame buffer 240 is created to capture the viewpoint below the physical buffer (e.g., lower left quadrant). The displays 200, 210 display the image in the correct configuration (upper left quadrant in the host display 200 and lower left quadrant in the client display 210). FIG. 2B illustrates the frame buffer being expanded so that a logical frame buffer 240 is created to capture the viewpoint of the image to the right of the physical display (e.g., upper right quadrant). The displays 200, 210 display the image incorrectly as the upper right hand quadrant is displayed in the client display 210 below the upper left hand quadrant that is displayed in the host display 200.

In addition to managing the configuration (size, shape) of the virtual frame buffer the user needs to manage the association of logical frame buffers to client displays to ensure the logical buffer is remotely presented to the appropriate client display (identify what display each RFB server is transmitting a logical buffer to). As displays are added, removed, or rearranged the logical frame buffers may need to present the data to different displays and that association needs to be managed.

Figure 3:
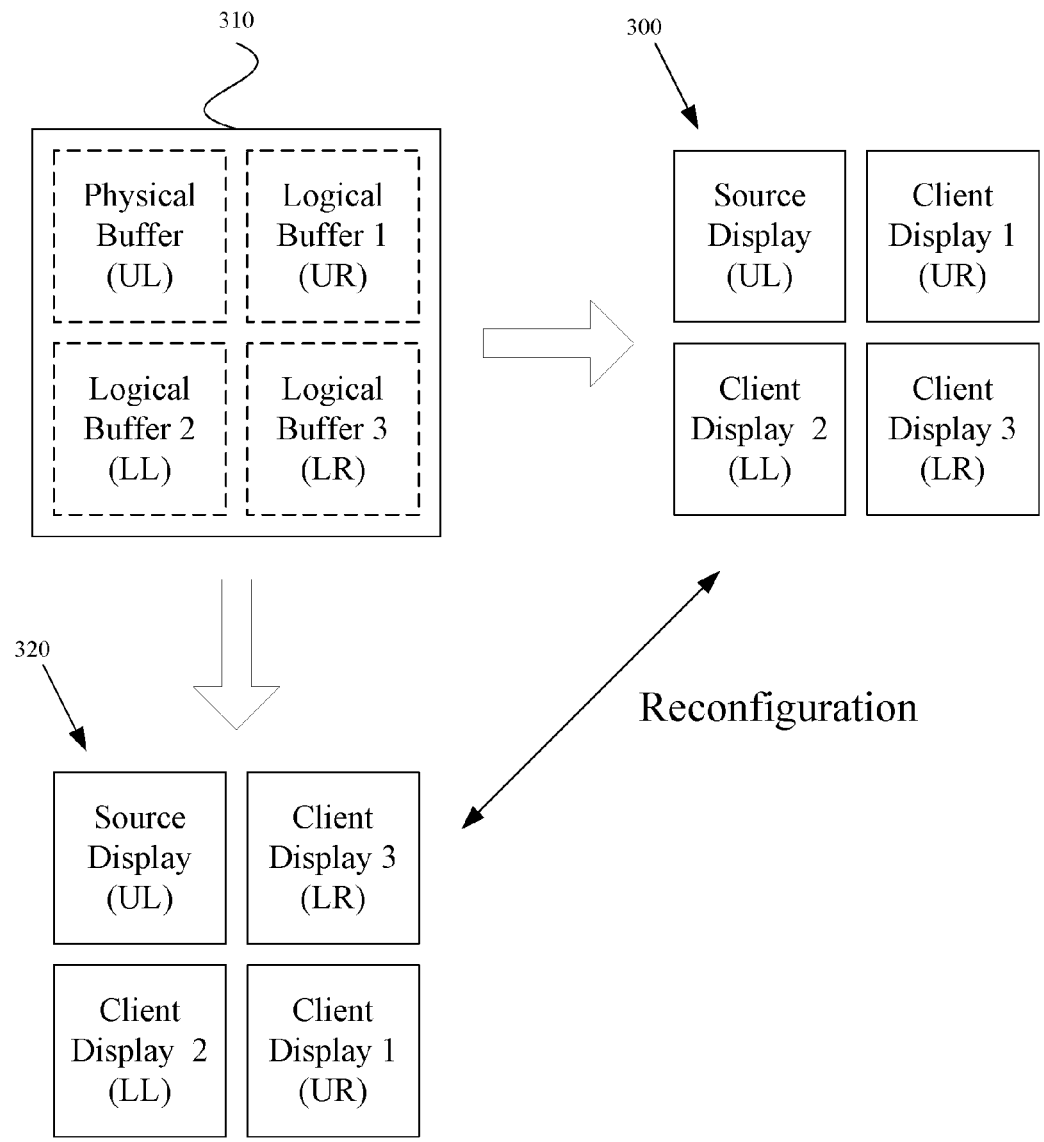
FIG. 3 illustrates an example rearrangement of displays utilized by a host wireless device and the impact of not re-associating the logical frame buffers, according to one embodiment.

FIG. 3 illustrates an example rearrangement of displays utilized by a host wireless device and the impact of not re-associating the logical frame buffers. The initial configuration 300 of the displays includes a 2×2 grid of displays including a host display and 3 client displays. In response to the display configuration, the virtual frame buffer 310 is expanded to be a 2×2 grid of frame buffers that includes a physical frame buffer and 3 logical frame buffers. Each of the frame buffers may be associated with a specific quadrant of the image to be displayed (upper left (UL), upper right (UR), lower left (LL), lower right (LR)). The physical and logical frame buffers are mapped to the displays (physical to host, and logical-n to client-n) and the image is presented over the four displays.

If the displays are reconfigured to a configuration 320 where the $1^{st}$ and $3^{rd}$ client displays are switched the size and shape of the virtual frame buffer 310 has not changed. However, if the association of the virtual frame buffers is not changed the image displayed across the display configuration will have the upper and lower right hand quadrants switched.

As displays are swapped in and out and the arrangement of the displays is modified, the managements of the virtual frame buffer and the association between the frame buffer and the displays becomes increasing difficult.

A dynamic geometry manager may be utilized to assist the user in organizing the virtual frame buffer. The dynamic geometry manager may enable the user to arrange the virtual frame buffer as they desire. The configuration of the virtual buffer may be to match the configuration of the displays so that the size and shape of the virtual frame buffer and the association between the frame buffers and the displays can be readily managed. According to one embodiment, the dynamic geometry manager may present the user with an identifier (e.g., icon) for each of the displays that are being utilized to create the larger display area. The presentation of the identifiers may be, for example, random or may be in order based on when the displays were detected. The user may move the icons around to configure the virtual frame buffer as they desire (e.g., match the configuration of the displays). Once the user configures the icons as they desire, the virtual frame buffer may then be configured to match the configuration identified by the user. The user may initiate the configuration of the virtual frame buffer after the user has completed configuring the display identifiers.

The display identifiers may automatically be presented or may be presented when requested by the user. Likewise, once the user has configured the icons the user configuration may remain on the display or may be closed or shrunk so as not to take up display area. If the user wants to reconfigure the virtual frame buffer, they can reopen or resize the identifiers (if required) and reconfigure the identifiers and once complete have the virtual frame buffer reconfigured as well. If the user reconfigures the displays the user may also reconfigure the virtual frame buffer in a similar manner. For example, if the user switches displays or reconfigures the arrangement of the displays (e.g., changes from tall and narrow to short and wide) the user may also reconfigure the virtual frame buffer by reconfiguring the icons to switch displays or alter the geometry. Having the virtual frame buffer mirror the configuration of, or at least follow a similar configuration to, the displays makes managing the virtual frame buffer and the presentation of the image on the displays easier.

According to one embodiment, the dynamic geometry manager may include an automated policy for expanding the virtual frame buffer. The policy may automatically grow the display and place the client's viewport in the newly created empty portion of the virtual frame buffer. The policy may expand the virtual frame buffer so that each new display added adds a new logical frame buffer to the right of the previous one. The policy may list the client displays in a grid and adds them in raster scan order (left to right, top to bottom). When a device disconnects, the order is maintained and each device in turn shifts into the vacated space. While effective for simple situations, this configuration has limitations. In particular, the fixed policy of the system can yield configurations that do not reflect the physical arrangement of devices. The user may be able to reconfigure the virtual frame buffer created by a policy to reflect the users' preferences (e.g., match the configuration of the displays).

According to one embodiment, the dynamic geometry manager may utilize sensor data to provide information about the spatial configuration of the displays and utilize this information to generate the virtual frame buffer. The sensor data may be provided, for example, by the host, by other wireless devices, by a separate component, or some combination thereof. Regardless of where the spatial configuration data comes from the dynamic geometry manager may utilize it to create a virtual frame buffer that mirrors the physical layout of the displays. For example, if a user were to swap the physical positions of two devices, the sensors may detect this rearrangement and update the virtual frame buffer accordingly. Similarly, if the overall configuration of the displays was altered, for example from a 2×3 grid into a 3×2 grid, the spatial data could be used to alter the overall geometry of the frame buffer in addition to the individual positioning of viewport for each device.

The spatial data could also be used so that the client viewports can be rotated or scaled as appropriate. Furthermore, based on the policy used, the system has the option of representing the space between displays in the frame buffer or to disregard that information and have the viewports from the different clients be adjacent. The user may have the option to reconfigure (over ride) the virtual frame buffer created based on the spatial data.

Figure 4:
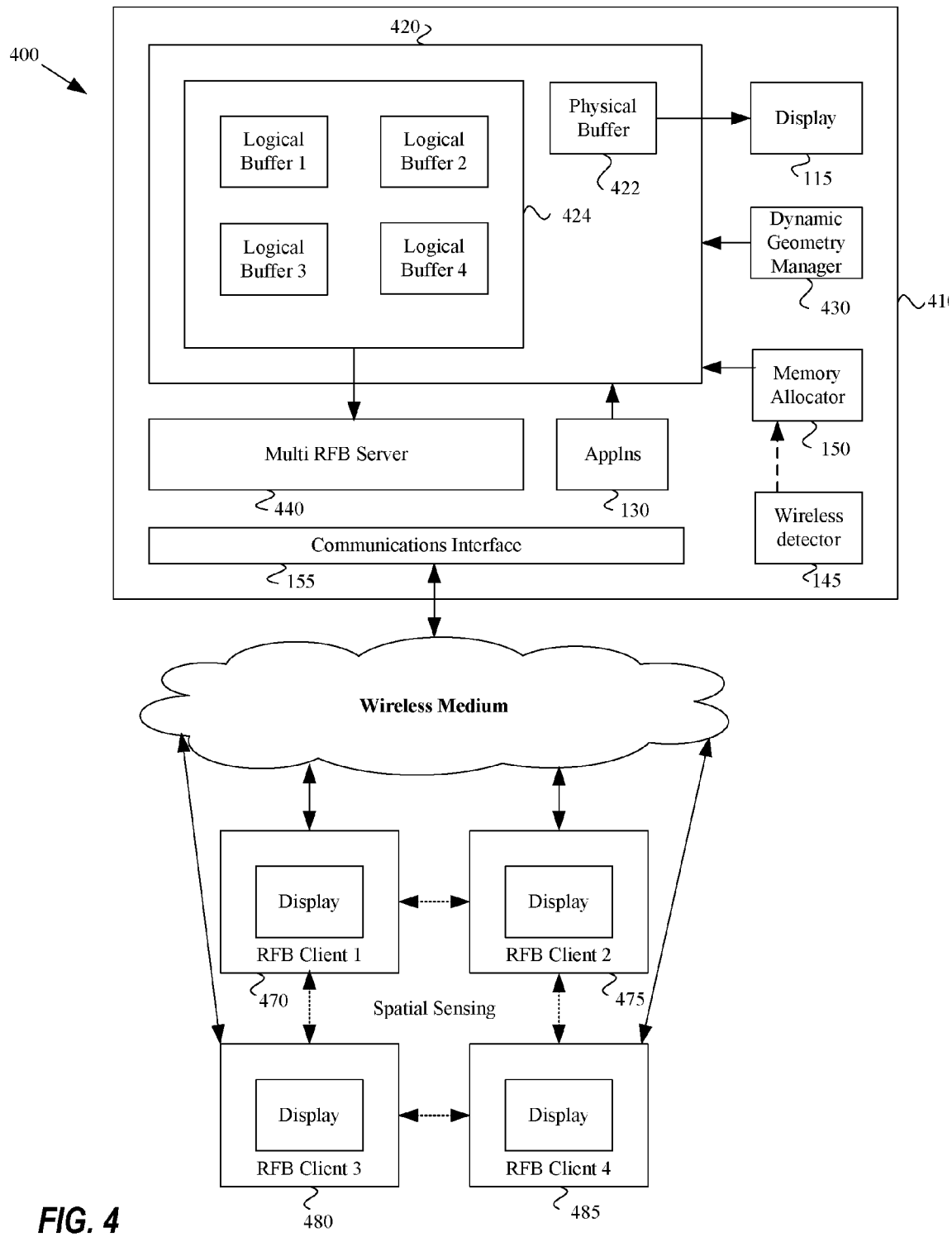
FIG. 4 illustrates a block diagram of an example system utilizing multiple wireless devices to provide an aggregated display, according to one embodiment.

FIG. 4 illustrates a block diagram of an example system 400 utilizing multiple wireless devices to provide an aggregated display. The system 400 is similar to the system 100. The system 400 may include a host wireless device 410, a wireless medium 160, and a plurality of client wireless devices (first through fourth client wireless devices 470, 475, 480, 485 are illustrated). The host wireless device 410 may include a display 115, a frame buffer 420, one or more applications 130, a multi-RFB server application 440, a memory allocator 145, a wireless detector 150, a dynamic geometry manager 430, and a communication module 155.

The frame buffer 420 may include a physical frame buffer 422 and a virtual frame buffer 424. The virtual frame buffer may include a plurality of logical frame buffers associated with the client wireless devices 470, 475, 480, 485. The configuration of the logical frame buffers within the virtual frame buffer 424 may be configured by the dynamic geometry manager 430. According to one embodiment, the dynamic geometry manager 430 may be user configured to a desired configuration (to match the physical layout of the displays 470, 475, 480, 485) as described above. According to one embodiment, the dynamic geometry manager 430 may be configured based on the spatial sensing of the displays 470, 475, 480, 485 as described above.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An apparatus comprising:
   a frame buffer having a first area allocated to buffer display information for a first portion of content, wherein the first portion is to be displayed on a local display;
   a frame buffer allocator to dynamically expand said frame buffer to include one or more additional areas allocated to buffer display information for a second portion of the content based on detection of one or more remote displays associated with one or more wireless devices, wherein the second portion is to be displayed on the one or more remote displays associated with one or more wireless devices;
   a dynamic geometry manager to determine an initial orientation of the one or more remote displays with respect to the local display and changes thereto, and orient the one or more additional areas of said frame buffer based on the initial orientation of the one or more remote displays with respect to the local display or changes thereto, wherein respective sections of the second portion of the content will be buffered in the one or more additional areas of said frame buffer based on the orientation thereof, wherein the orienting the one or more additional areas based on the initial orientation of the one or more remote displays or changes thereto is to ensure the first portion and the second portion of the content is displayed correctly across the local display and the one or more remote displays as they are oriented with respect to one another; and
   one or more remote-frame-buffer protocols to transfer the display information from the one or more additional areas to the appropriate ones of the one or more wireless devices.

2. The apparatus of claim 1, wherein the dynamic geometry manager is to enable a user to determine the initial orientation of the one or more remote displays with respect to the local display or changes thereto.

3. The apparatus of claim 1, wherein the dynamic geometry manager is to enable a user to initiate orientation of the one or more additional areas of said frame buffer.

4. The apparatus of claim 1, further comprising a spatial sensing means to determine the orientation of the one or more remote displays with respect to the local display.

5. The apparatus of claim 1, wherein said frame buffer allocator expands said frame buffer based on a display area of the one or more remote displays.

6. The apparatus of claim 1, wherein said frame buffer allocator expands said frame buffer based on a number of the one or more remote displays.

7. The apparatus of claim 1, further comprising a detector capable of detecting said other wireless devices and causing said frame buffer allocator to allocate the one or more additional areas of said frame buffer upon the detection of said other wireless devices.

8. The apparatus of claim 1, wherein the display information in the one or more additional areas includes pixels representing the content.

9. The apparatus of claim 1, wherein the display information in the one or more additional areas includes commands necessary to generate pixels representing the content.

10. A method comprising:
    establishing one or more wireless communication links between a host wireless device and one or more client wireless devices; expanding a frame buffer of the host device from a first area to buffer display information for content to be displayed on a local display of the host wireless device to include one or more additional areas allocated to buffer display information for content to be displayed on remote displays of the one or more client wireless devices; determining an initial orientation of the remote displays of the one or more client wireless devices with respect to the local display of the host wireless device and changes thereto; orienting the one or more additional areas of the frame buffer based on the initial orientation of the remote displays of the one or more client wireless devices with respect to the local display of the host wireless device, wherein respective sections of the content will be buffered in the one or more additional areas of said frame buffer based on the orientation thereof, wherein the orienting the one or more additional areas based on the initial orientations of the remote displays with respect to the local display and changes thereto is to ensure the content is displayed correctly across the remote displays of the one or more client wireless devices and the local display of the host wireless device as they are oriented with respect to one another; and transferring the display information from the one or more additional areas to the remote displays of the one or more client wireless devices.

11. The method of claim 10, further comprising sensing spatial arrangement of the remote displays for the one or more client wireless devices with respect to the local display for the host wireless device, wherein said determining orientation includes determining orientation of the one or more client wireless devices with respect to the host wireless device based on the sensed spatial arrangement.

12. A wireless device comprising:
    a display;
    a communication interface to establish wireless communication links with one or more or more other wireless devices having displays;
    a frame buffer having a first area allocated to buffer display information for content to be displayed on said display;
    a frame buffer allocator to dynamically expand said frame buffer to include one or more additional areas allocated to buffer display information for content to be displayed on the displays of said one or more other wireless devices;
    a dynamic geometry manager to determine an initial orientation of the displays of the one or more other wireless devices with respect to the display and changes thereto, and orient the one or more additional areas of said frame buffer based on the initial orientation of the displays of the one or more other wireless devices with respect to the display and changes thereto, wherein respective sections of the content will be buffered in the one or more additional areas of said frame buffer based on the orientation thereof, wherein the orienting the one or more additional areas based on the initial orientation of the displays of the one or more other wireless devices with respect to the display or changes thereto is to ensure the content is displayed correctly across the displays of the one or more other wireless devices with respect to the display as they are oriented with respect to one another; and one or more remote-frame-buffer protocols to transfer the display information from the one or more additional areas to said one or more wireless devices.

13. The wireless device of claim 12, wherein the dynamic geometry manager is to enable a user to determine orientation of the displays of the one or more other wireless devices.

14. The wireless device of claim 12, further comprising a spatial sensing means to determine the orientation of the displays of the one or more other wireless devices with respect to the display.

15. The wireless device of claim 12, wherein said frame buffer allocator expands said frame buffer based on one of: display area of said one or more other displays and number of said one or more other displays.

16. The wireless device of claim 12, further comprising a detector capable of detecting said other wireless devices and causing said frame buffer allocator to allocate the one or more additional areas of said frame buffer upon the detection of said other wireless devices.

17. The wireless device of claim 12, wherein the display information in the one or more additional areas includes one of: pixels representing the content, commands necessary to generate pixels representing the content, and display geometry and relative positioning representing the content.

* * * * *

UNITED STATES PATENT AND TRADEMARK OFFICE
CERTIFICATE OF CORRECTION

PATENT NO. : 8,686,921 B2
APPLICATION NO. : 12/347878
DATED : April 1, 2014
INVENTOR(S) : Kenton M. Lyons et al.

It is certified that error appears in the above-identified patent and that said Letters Patent is hereby corrected as shown below:

In the Drawings

On sheet 1 of 4, in Figure 1, Reference Numeral 126, line 2, delete " Buffer " and insert -- Buffer --, thereof.

On sheet 1 of 4, in Figure 1, Reference Numeral 124, line 2, delete " Buffer " and insert -- Buffer --, thereof.

On sheet 1 of 4, in Figure 1, Reference Numeral 122, line 2, delete " Buffer " and insert -- Buffer --, thereof.

In the Claims

In column 8, line 54, in claim 12, after "links with one" delete "or more".

Signed and Sealed this
Fifteenth Day of July, 2014

Michelle K. Lee
*Deputy Director of the United States Patent and Trademark Office*